US010411759B2

(12) United States Patent
Thiele et al.

(10) Patent No.: US 10,411,759 B2
(45) Date of Patent: Sep. 10, 2019

(54) SYSTEM COMPRISING A CAPACITIVE INFORMATION CARRIER FOR ACQUIRING INFORMATION

(75) Inventors: Jan Thiele, Chemnitz (DE); Sascha Voigt, Bernsdorf (DE); Thoralt Franz, Zwoenitz/Ot Bruenlos (DE); Matthias Foerster, Dresden (DE); André Kreutzer, Mittweida (DE)

(73) Assignee: Touchpac Holdings, LLC, New York, NY (US)

( * ) Notice: Subject to any disclaimer, the term of this patent is extended or adjusted under 35 U.S.C. 154(b) by 104 days.

(21) Appl. No.: 13/703,467

(22) PCT Filed: Jun. 10, 2011

(86) PCT No.: PCT/EP2011/059685
§ 371 (c)(1),
(2), (4) Date: Jan. 24, 2013

(87) PCT Pub. No.: WO2011/154524
PCT Pub. Date: Dec. 15, 2011

(65) Prior Publication Data
US 2013/0115878 A1 May 9, 2013

Related U.S. Application Data

(60) Provisional application No. 61/353,955, filed on Jun. 11, 2010, provisional application No. 61/371,035, filed on Aug. 5, 2010.

(30) Foreign Application Priority Data

Jun. 11, 2010 (EP) ...................................... 10006067
Aug. 5, 2010 (DE) .................... 20 2010 011 032 U
Aug. 5, 2010 (EP) ...................................... 10075337

(51) Int. Cl.
H04B 5/00 (2006.01)
G06K 7/08 (2006.01)
(Continued)

(52) U.S. Cl.
CPC ........... *H04B 5/0012* (2013.01); *G06K 7/081* (2013.01); *G06K 7/089* (2013.01); *G06K 19/067* (2013.01); *G06K 19/07788* (2013.01)

(58) Field of Classification Search
CPC ........... G06K 19/0716; G06K 19/0717; G06K 19/0723
(Continued)

(56) References Cited

U.S. PATENT DOCUMENTS 6,813,957 B1 * 11/2004 Platz .................... G01D 5/24
73/780
7,084,933 B2 * 8/2006 Oh ..................... G02F 1/13338
178/18.03
(Continued)

FOREIGN PATENT DOCUMENTS

EP 2 088 532 A1 8/2009

*Primary Examiner* — Ajibola A Akinyemi
(74) *Attorney, Agent, or Firm* — Wolf, Greenfield & Sacks, P.C.

(57) ABSTRACT

The invention describes a system comprising a capacitive information carrier, wherein an electrically conductive layer is arranged on an electrically non-conductive substrate, and a surface sensor, wherein the information carrier is in contact with the surface sensor. Furthermore, the invention comprises a process for acquiring information, comprising a capacitive information carrier, a capacitive surface sensor, a contact between the two elements and an interaction which makes a touch structure of the information carrier evaluable for a data-processing system connected to the surface sensor and can trigger events associated with said information carrier.

16 Claims, 25 Drawing Sheets

Figure 1:
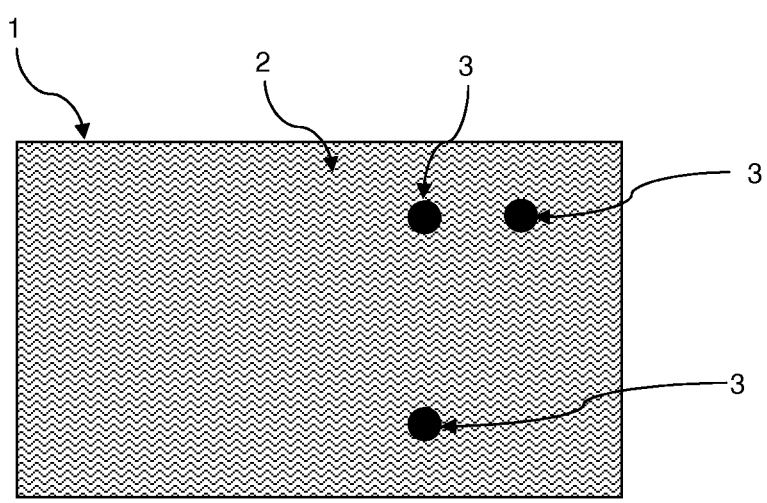
Figure 2:
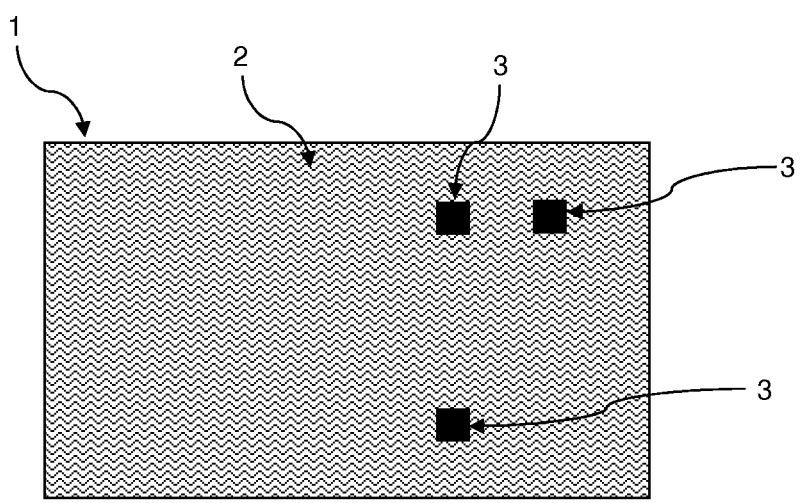
Figure 3:
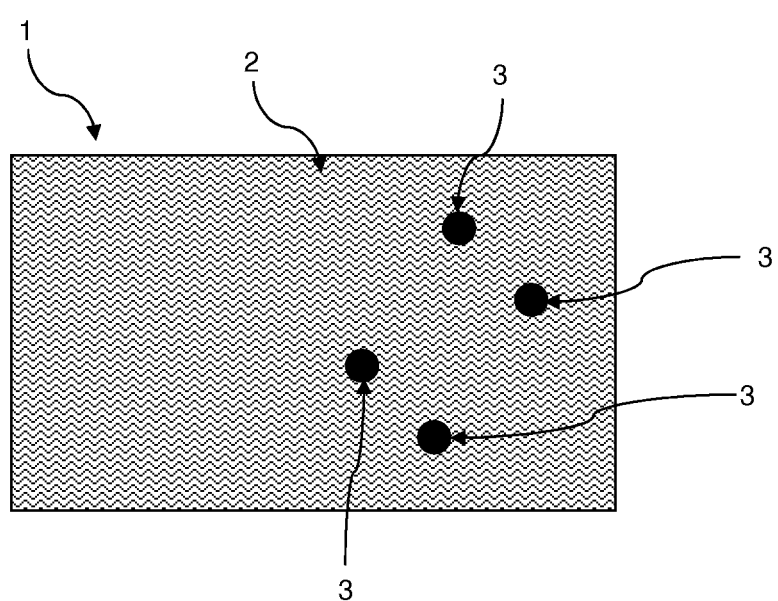

(51) Int. Cl.
*G06K 19/067* (2006.01)
*G06K 19/077* (2006.01)

(58) Field of Classification Search
USPC .......................................................... 455/41.1
See application file for complete search history.

(56) References Cited

U.S. PATENT DOCUMENTS

| | | | |
|---|---|---|---|
| 9,563,316 B2* | 2/2017 | Standing | G06F 3/044 |
| 2009/0160461 A1* | 6/2009 | Zangl | G01D 5/24 |
| | | | 324/684 |
| 2011/0063242 A1* | 3/2011 | Bytheway | G06F 3/044 |
| | | | 345/174 |
| 2011/0253789 A1 | 10/2011 | Thiele et al. | |
| 2012/0125993 A1* | 5/2012 | Thiele | B42D 25/405 |
| | | | 235/375 |
| 2012/0306813 A1 | 12/2012 | Foerster et al. | |
| 2015/0199042 A1* | 7/2015 | Standing | G06F 3/044 |
| | | | 345/174 |

\* cited by examiner

SYSTEM COMPRISING A CAPACITIVE INFORMATION CARRIER FOR ACQUIRING INFORMATION

This is the U.S. national stage of International application PCT/EP2011/059685, filed Jun. 10, 2011 designating the United States and claiming priority to EP10006067.2, filed Jun. 11, 2010, EP 10075337.5, filed Aug. 5, 2010 and DE 20 2010 011 032.7, filed Aug. 5, 2010 and the benefit of U.S. provisional application 61/353,955, filed Jun. 11, 2010 and of U.S. provisional application 61/371,035, filed Aug. 5, 2010.

The invention describes a system comprising a capacitive information carrier, wherein at least one electrically conductive layer is arranged on an electrically non-conductive substrate, and a surface sensor, wherein the two elements are in contact. Furthermore, the invention comprises a process for acquiring information, comprising a capacitive information carrier, a capacitive surface sensor, a contact between the two elements, and an interaction which makes a touch structure present on the information carrier evaluable for a data-processing system connected to the surface sensor and can trigger events that are associated with the information carrier.

A capacitive surface sensor is in particular a physical interface for sensing electrical capacitances and/or capacitance differences within subareas of a defined surface and is also known as a touchscreen. Devices containing surface sensors include, for example, smartphones, mobile phones, displays, tablet PCs, tablet notebooks, touchpad devices, graphics tablets, televisions, PDAs, MP3 players, trackpads and/or capacitive input devices. Such a surface sensor can also, for example, be a constituent part of input devices as a touchscreen, touchpad or graphics tablet. Touchscreens are also known as sensor screens. Such input devices are employed inter alia in smartphones, PDAs, touch displays and notebooks.

Known reading devices or apparatuses for the sensing and reading of capacitive information are individual devices that have this and only this purpose. The disadvantages of the reading devices or apparatuses disclosed in the prior art are that always independent capacitive reading devices have to be available for the individual applications and these are often connected via an interface to data-processing media. The distribution and acceptance of reading devices are consequently relatively poor and associated with extra cost due to the purchase of the reading devices. In addition, the linkage of hard-copy information with digital information is very difficult to implement. One possibility is bar codes, which are read with suitable scanners or cameras and are capable of calling up digital information. The disadvantage of known bar codes is that they are associated with system-typical shortcomings and, for example, information can be copied any number of times, visually occupies space on products or advertising media, is difficult to individualize in sufficiently good quality, and there is a need for a direct visual link between the code and the sensing unit which, as a result of dirt, scratches, light conditions etc., can hamper or completely prevent the correct sensing and reading of the information. Within a reading device, the capacitive data carriers known to date always form a bridge between (at least) one reading and one receiving electrode. Depending on the presence or absence of a capacitive structure, a logical "1" or "0" is identified.

The prior art shows several ways of producing, with the aid of printing techniques or other coating processes, information carriers that can be read with the aid of a suitable reading process or reading device. Probably the most widely distributed information carriers produced in this way are bar codes in the form of a one-dimensional bar code or, for example, of a two-dimensional variant. These are sensed with suitable optical scanners and possibly further processed via corresponding data-processing systems.

The printing techniques and coating techniques for the production of such features also continue to develop further. EP 1 803 562, for example, describes a process for the transfer of imaging layers from a carrier film or from a transfer film to a print sheet in a sheet-processing machine. An adhesive is applied here in a first applicator and fed together with a transfer film in a further coating unit, and material from the transfer film is applied by adhesion to the print sheet. In this process, a transfer nip is created in the coating unit and the transfer film along the surface of a press roll is laid with the side coated with the transfer material on a print sheet and fed under pressure together with the latter through the transfer nip, so that the imaging layers are adhesively transferred in areas provided with adhesive from the carrier film to the print sheet. In this way, bar codes and alphanumeric information can be applied without any difficulty.

Prior art surface-printed materials have also been disclosed in U.S. Pat. Nos. 5,818,019, 3,719,804, 4,587,410 and US 2006/0118612, which materials permit the reliable verification or validation of data. This can make sense for medicines and their packages, for example, but also for lottery tickets. The printed information is used, for example, for authentication or validity checking. Capacitively readable information carriers are known, among other things, from applications U.S. Pat. No. 3,719,804 (Permanent Information Storage) and U.S. Pat. No. 4,587,410 (Parking System). In the last-named example, the processing and changeability of capacitive structures for a parking meter are disclosed. By means of a mechanical unit, the capacitive structure in the reading device is changed step-by-step, thus changing its "inner value". An individualization of the structures is not envisaged. The complete system is a self-contained system without interaction with other systems or data processing or data storage. In U.S. Pat. No. 3,719,804, the production possibilities by means of printing techniques such as, for example, screen printing, flexographic printing and gravure printing are described. The description refers to materials processable in their liquid state that are suitable for printing processes. This is associated with all the problems inherent in inks processable in their liquid state. The inks that are suitable are very expensive, contain solvents, have a limited life and cause process-related problems. The applied circuit paths are individualized with the aid of separation techniques. The reading process is highly position-dependent and is associated with a fixed reading position of the information carrier in the reading device.

In short, the solutions proposed in the prior art for information carriers show several disadvantages. For example, they are not inexpensive enough for mass application, can only be incompletely recycled owing to their complex structure (RFID systems), are in some cases easy to copy (bar codes), generate high expense due to attachment to the end product or are poorly or not at all amenable to further print processing (chip cards).

Starting from this prior art, it is the object of the present invention to provide a system that has none of the shortcomings or disadvantages of the prior art.

In the meaning of the invention, an event is in particular something that triggers an action and hence a change of state, preferably within applications. Such events can, for example, be user inputs or system events. The events are preferably triggered on devices that themselves carry the surface sensor, for example smartphones, mobile phones, displays, tablet PCs, tablet notebooks, touchpad devices, graphics tablets, televisions, MP3 players, trackpads and capacitive input devices, without being limited thereto.

The object is achieved by the features specified in the independent claims, and preferred embodiments of the invention are described in the subclaims.

It was totally surprising that the disadvantages of the prior art could be overcome with the inventive system and with the use of information carriers and systems and by means of the inventive process for acquiring information.

Consequently, a system for the transfer of information is provided, said system comprising at least
 a. a capacitive information carrier, said information carrier having at least one electrically conductive layer arranged on an electrically non-conductive substrate and
 b. a capacitive surface sensor,
wherein the information carrier is in contact with the surface sensor and the contact is preferably a static and/or dynamic contact. It is furthermore preferred that a capacitive interaction exists between the information carrier and the surface sensor. In the meaning of the invention, an information carrier is in particular a medium for the storage, replication, deposition and/or assignment of information.

According to a preferred embodiment of the invention, at least one electrically conductive layer is arranged as a touch structure on an electrically non-conductive substrate and comprises at least one touch point, a coupling surface and/or a conductive trace.

In the meaning of the invention, a coupling surface is in particular an electrically conductive area on the substrate. The coupling surface represents a preferred variant of the inventive information carrier and, for example, makes it possible to couple extraneous capacitances that are not a constituent part of the touch structure and hence raise the effective electrical capacitance of the information carrier's touch structure. As a result, the information carriers can be read soundly and reliably. This can be effected by a person's touch or proximity as well as by coupling with an object.

Conductive traces comprise preferably an electrically conductive layer and preferably represent an electrical connection between two or more subareas.

In a preferred embodiment, the substrate is advantageously made of a plastic, a paper, a cardboard, a wood-based material, a composite, glass, ceramic, textile, leather or a combination thereof. The substrate is in particular an electrically non-conductive substance which is preferably flexible and is of low weight. Light-permeable and light-impermeable substrates can be used. The preferred plastics are in particular PVC, PETG, PV, PETX, PE and synthetic papers.

It is preferred that the electrically conductive layer is a metal layer, a layer containing metal particles, a layer containing electrically conductive particles, an electrically conductive polymer layer or a layer of at least a combination of these layers. Electrically conductive particles in this connection are carbon black and graphite particles in particular. Polymers in the meaning of the invention are in particular a substance composed of a collective of chemically uniformly structured macromolecules (polymer molecules) that nevertheless usually differ in terms of their degree of polymerization, molar mass and chain length. The polymers are preferably electrically conductive. In such polymerically uniform substances, all the macromolecules have preferably the same structure and differ merely in their chain length (degree of polymerization). Such polymers can be called polymer homologues. Polymers can be selected from the group comprising inorganic polymers, organometallic polymers, completely or partly aromatic polymers, homopolymers, copolymers, biopolymers, chemically modified polymers and/or synthetic polymers. Particularly preferred are polymers selected from paraphenylene, polyacetylene, polypyrrole, polythiophene, polyaniline (PANI) and PE-DOT. The information carrier is therefore inexpensively producible by means of a mass production process.

According to the invention, a touch structure is in particular a layer of conductive material applied in a pattern. As a result of the inventive combination of these two properties, electrical conductivity and structure, it has surprisingly become possible to achieve a specific interaction of the touch structure with capacitively effective areas of a surface sensor.

Since the touch point, conductive trace and coupling surface can preferably comprise the same or similar electrically conductive materials, an information carrier can be preferably produced through the application of a technological process. As a result, the information carriers can be easily and economically realized as a mass product.

In the meaning of the invention, a capacitive surface sensor can be termed a touchscreen in particular.

In the prior art, such a touchscreen comprises in particular an active circuit, the touch controller, which is connected to a structure of electrodes. These electrodes are usually divided into transmitting and receiving electrodes. The touch controller preferably controls the electrodes in such a way that a signal is transmitted between in each case one or more transmitting electrodes and one or more receiving electrodes. In the touchscreen's state of rest, the signal remains constant. The purpose of a touchscreen described in the prior art is in particular the detection of fingers and their position on the surface of the touchscreen. Here, the action of a finger causes the signal between the electrodes to be changed. The signal is usually diminished, because the acting finger takes up part of the signal from the transmitting electrode and a smaller signal reaches the receiving electrode.

An advantageous property of the touch structure is its conductivity. If, instead of a finger, a preferred information carrier with the touch structure is brought into contact with a surface sensor, the conductive areas preferably cause the same effect as a finger. However, the conductive structure is structured into areas, since on the one hand the effect, which is comparable to the action of a finger, is to be maximized in certain areas, in particular at the touch points, in order to be optimally detectable for the touch controller. It thus becomes advantageously possible for a data-processing system connected to the surface sensor to evaluate the touch structure.

In another preferred embodiment, at least one electrically conductive touch structure replicating the arrangement and/or properties of fingertips is arranged on an electrically non-conductive substrate. The touch structure comprises at least one touch point, a conductive trace and/or a coupling surface. It is preferred that the combination of at least one or more touch points in a touch structure replicates the arrangement and/or properties of fingertips. In the meaning of the invention, an input on a surface sensor can be executed with the touch structure, preferably with at least one coupling surface, more preferably at least one trace and particularly preferably with at least one touch point, similarly to with a finger. For this reason, the preferred embodiment of the invention can thus be described in such a way that the touch structure replicates the properties of fingertips, wherein the property of the touch structure is preferably described to the effect that said touch structure can execute an input on a surface sensor just like a finger. This additional property of the touch structure of replicating the arrangement and/or properties of fingertips is particularly advantageous because such a structure is easy to evaluate for a data-processing system connected to the surface sensor and can be processed more easily by software technology.

As a result of the structuring of the conductive area on the information carrier, a touch point replicates the properties of fingertips in a suitable manner. It is known to those skilled in the art that an input can be executed on a touchscreen or surface sensor with one or more fingers (single or multi-touch). The technology of surface sensors and the principles of input or rather the properties of a finger through which the input is effected are also known to those skilled in the art. For example, in addition to the electrical properties of the finger (e.g. conductivity), density, input pressure and distance from the surface sensor can also affect the input. As a result of the structuring the conductive area, the preferred system achieves the same effect on a surface sensor as a finger, i.e. an input at a position on the surface sensor defined by the conductive areas of the information carrier. Without great experimental effort, a person skilled in the art could thus design the touch structure of the information in such a way that the properties of fingers or fingertips are replicated and an input can be executed on a surface sensor with the electrically conductive surfaces of the information carrier.

In one example, without being limited thereto, of a preferred information carrier in interaction with a so-called touchscreen with an electrode arrangement in the form of a grid, a suitable structuring of the touch point is, for example, a circle with a diameter of 1 to 20 mm, preferably 4 to 15 mm and more preferably 6 to 10 mm. Since a touchscreen is suitable for determining the positions of fingertips, a touch point of an information carrier is also determinable by the touchscreen in the same way. The touchscreen or surface sensor can advantageously not distinguish whether the input has been executed by the touch structure of an information carrier or by a finger.

It may be preferred to attach several touch structures to the preferred information carrier. The shape, orientation, number, alignment, distance and/or position of subareas and preferably of the touch points of the touch structure can be advantageously used for storing information.

In a preferred embodiment of the invention, it may be provided that on the substrate a touch structure with at least one coupling surface is arranged which is preferably connected to at least one touch point via at least one conductive trace and/or part of the touch point is a coupling surface.

In another preferred embodiment, the electrically conductive material is a printed layer on the substrate. The layer is thus easily and inexpensively realisable with an additive process. However, it is also preferred that the electrically conductive layer is transferred to the substrate by means of a transfer process. According to the invention, the application of the layer to the substrate can be effected with essentially known transfer processes; this is preferably the transfer film process and particularly preferably a cold film transfer process. A person skilled in the art is familiar with such processes. It goes without saying that any other processes for the structured application of an electrically conductive layer can also be used.

According to a further preferred embodiment, the electrically conductive layer is realized through the application of a subtractive process in which areas of the layer are removed. Familiar etching or laser ablation processes are employed. In the latter case, the ablated material is evaporated through the action of the laser beams. Other processes can also of course be used.

According to a further preferred embodiment, at least one cover layer partly or wholly covering the substrate of the information carrier is advantageously situated on the information carrier. The cover layer can be advantageously used as protection or for concealing the information carrier's touch structure. In a preferred variant, this cover layer can also be designed as a cover plate. The cover plate can be made of rigid or flexible materials.

It was totally surprising that the information carrier or a group of information carriers and/or the inventive system can be used in numerous areas of economic life. These comprise, for example, playing cards, collectible cards, stamps, post marks, postal charges, goods logistics, goods tracking, admission systems, admission tickets, access to closed areas, virtual content, marketing applications, customer loyalty, lottery and prize competitions, membership passes, transit passes, payment applications, certificates of authenticity, certificates, protection from counterfeiting, copy protection, signatures, delivery notes, bank statements, patient information leaflets, objects within computer games, music/video/e-book downloads, bonus stamps/programmes, device controls or gift cards, without being limited to these.

It may be preferred that the information carrier is connected to an object or the object itself serves as the substrate. An object in the meaning of the invention is in particular a thing, article or entity. An object is preferably selected from the group comprising a package, crockery, print products, clothing, furniture, documents, toys, consumer articles, foods, semi-finished products, machine components, construction materials, one- and multi-way containers and/or electrical equipment. In principle, even objects without surfaces can be direct carriers of an information carrier (the object performs the substrate function) or even indirectly such that the information carrier can be attached or applied to the object. The attachment or application can be effected, for example, self-adhesively or by means of other known joining technologies or auxiliaries, for example a label on textiles.

Advantageously, at least one information carrier is at least area-wise in contact with at least one surface sensor. To this end, there is on a substrate at least one electrically conductive layer applied area-wise, with at least one area of the electrically conductive layer being a subarea. The subarea(s) are also termed a touch structure in the meaning of the invention. The shape, orientation, number, alignment, distance and/or position of the touch structure, preferably of the coupling surface, more preferably of the conductive traces and particularly preferably of the touch points or their subareas preferably form the information so that at least one event is triggered when the information carrier is positioned at least area-wise on the surface sensor or by means of a relative movement of at least one area of the information carrier vis-à-vis the surface sensor. In the meaning of the invention, area-wise positioning of the information carrier on the surface sensor implies that in particular at least one area of the information carrier is in contact with at least one area of the surface sensor.

The information carrier is preferably brought into contact with the surface sensor in such a way that at least one event is triggered by the surface sensor.

In the meaning of the invention, bringing into contact implies that there is preferably no gap in particular between the information carrier and the surface sensor. This means the information carrier is preferably touching the surface sensor. However, it may also be preferred that there is no direct contact between the information carrier and the surface sensor, but that proximity is sufficient to trigger an event. In the case of proximity, there is a preferred distance of greater than 0 cm to 2 cm between the information carrier and the surface sensor.

In another preferred embodiment, the system comprises at least one capacitive information carrier and at least one capacitive surface sensor, wherein contact or proximity is established between the information carrier and the surface sensor and a capacitive interaction is achieved as a result. As a result of the capacitive interaction, the touch structure of the information carrier becomes evaluable for a data-processing system connected to the surface sensor and can thus trigger events associated with the information carrier.

As a result of this capacitive interaction, an event can be preferably triggered on the device carrying the surface sensor. For its part, the event triggers actions, such as the activation and/or termination of an application, the changing of numeric values and/or texts, the manipulation of graphics, the changing of data pools or the gaining of access to information services, without being limited thereto. The invention therefore also relates to the use of the information carrier comprising a touch structure for capacitive interaction with a surface sensor.

It is preferred that the surface sensor comprises at least one capacitive display and the device containing the surface sensor is selected from the group comprising smartphones, mobile phones, displays, tablet PCs, tablet notebooks, touchpad devices, graphics tablets, televisions, PDAs, MP3 players, trackpads and/or capacitive input devices, without being limited to these. A capacitive surface sensor can, for example, also be a constituent part of input devices as a touchscreen, touchpad or graphics tablet. Touchscreens are also known as sensor screens. Such input devices are used inter alia in smartphones, PDAs, touch displays and notebooks. A surface sensor does not necessarily have to be situated in front of a display. For example, it can also be designed and used as a keyboard. Along with a click function, a drag-and-drop operation can also be performed. Furthermore, several simultaneous contacts in the form of a so-called "multi-touch" can be employed in order in particular to rotate or scale indicated elements, for example. The surface sensor is designed in this case preferably as Projected Capacitive Touch (PCT) technology. Variants of PCT technology include, for example, mutual capacitance and self-capacitance, which can be designed as mutual capacitance screens and self-capacitance screens.

The inventive information carriers are advantageously distinguished by the fact that a connection to a device with a surface sensor can be realized. The surface sensor acts preferably analogously to a capacitive reading device, but without being dependent in terms of hardware on permanently defined conductive traces or reading electrodes, as currently limitingly known from the prior art (U.S. Pat. No. 3,719,804—Permanent Information Store). As a result of the inventive information carrier, an extension of the functional scope of devices containing capacitive surface sensors is opened up. As a result, for example, information becomes more readily accessible and/or the use of the devices is simplified (above all for physically restricted, disabled or older people) and/or novel applications are made possible, without being limited thereto.

On the information carrier, information in the form of the touch structure, which can be designed as a subarea, can be preferably stored. When the information carrier is brought into contact or the proximity of the surface sensor, the information becomes readable via the latter, and the capacitance in particular is partially changed.

The touch structure forming the information, i.e. the subareas of an area, comprises an electrically conductive material. In accordance with the disclosure of the present invention, a person skilled in the art recognizes that the touch structure comprises corner points and/or filled surfaces defined by curves, for example rectangles, circles or similar figures. The spatial relations of the subareas to each other (orientation, number, alignment, distance and/or position) and/or the shape of the subareas preferably represent the information. When the information carrier is positioned on the surface sensor, the touch structure, preferably the conductive traces, more preferably the coupling surface and particularly preferably the touch points are interpreted for example as a finger input, so that from the subareas of the touch structure, in particular from the touch points, the coded information is determinable, for example in the form of a binarily coded number, without being limited to this. In addition, an information carrier is determinable in particular in that the interaction determined by the surface sensor between the information carrier and surface sensor, the geometry given by the touch structure of the information carrier, itself represents a code in a coding system. The positioning can also be effected with a relative movement of the information carrier vis-à-vis the surface sensor. It is preferred that the surface sensor in a movement relative to the information carrier progressively receives information wholly or partly from the information carrier. Depending on the positions of the information carrier in relation to the surface sensor, different events can also be generated. Decisive for this is, for example, the direction of movement or residence time of the information carrier vis-à-vis the surface sensor.

The information carrier can be advantageously designed as a simple, signed or coded information carrier. The information carrier is consequently advantageously suitable as a code for the authorized use of certain quantities of data or hardware, wherein the communication can take place via a known data network such as the Internet, for example. It can also take place via a device that has the surface sensor.

As summarized in the following, an action is what is preferably triggered by an event.

In connection with the device containing a surface sensor, the information carrier is in particular:
- a simple information carrier for triggering actions in the program sequence on the device itself,
- a signed information carrier for triggering actions in the program sequence of the device and/or an external data-processing system, which can be connected via a data network,
- an encoded information carrier which is decoded by the program sequence of the device and/or an external data-processing system and triggers actions in the program sequence of the device or of the external data-processing system.

According to another preferred embodiment, at least two touch structures each with at least one associated coupling surface are situated on the substrate. With this arrangement, at least two events can be triggered when the user touches each associated coupling surface, for example. In this way, yes/no decisions, for example, can be triggered by the user by means of the information carrier.

Several information carriers can be advantageously read in combination, in particular next to one another and/or on top of one another and/or temporally one after another. As a result, it is surprisingly possible to store complex information on an information carrier, with the information carrier being printed on cardboard and/or paper, for example. The information carrier surprisingly combines print media with digital media, which was not previously possible in this way.

It is furthermore preferred that the information carrier is assigned to a data set in a data-processing system and the data set remains constant or changes. This can be effected, for example, by using the information carrier and/or over time, without being limited thereto.

The information carrier can be advantageously used in such a way that the information carrier in connection with the surface sensor can be assigned via the touch structure to an action of a data-processing system or triggers said action. This action applies in particular to non-networked data-processing systems and particularly preferably to networked data-processing systems.

The invention also relates to a process for the acquisition of information, comprising
  a. providing at least one capacitive information carrier comprising at least one electrically conductive touch structure present on an electrically non-conductive substrate,
  b. providing at least one capacitive surface sensor,
  c. contacting the information carrier according to a. with the surface sensor according to b., which contact can be static and/or dynamic and
  d. triggering a capacitive interaction between the surface sensor and the information carrier, wherein, as a result of the capacitive interaction, the touch structure of the information carrier becomes evaluable for a data-processing system connected to the surface sensor and can trigger events associated with the information carrier.

In this case, at least one capacitive surface sensor and at least one capacitive information carrier are provided, with the information carrier having an electrically non-conductive substrate which comprises at least one electrically conductive touch structure. The at least one information carrier is brought into contact with the at least one surface sensor, and the contact can be static and/or dynamic. Static contact means that, in particular at the moment of evaluation of the information carrier, no or an inessential relative movement takes place vis-à-vis the surface sensor. By contrast with this, dynamic contact means that in particular a relative movement during evaluation can take place vis-à-vis the information carrier. According to the invention, the contact can also comprise proximity. As a result of the contact, a capacitive interaction is triggered, with information being transferred from the information carrier to the surface sensor due to the capacitive interaction.

Without intending to be limiting, the invention will be explained below with reference to an example. In the following, it is shown by way of example how information can be coded by means of a touch structure (in this case, by means of the touch points of the touch structure) on an information carrier. This is intended to show by way of example the invention's quantitative dimension.

The area of the electrically conductive layer—the touch structure—comprises preferably subareas. The information of the information carrier is composed in particular of the shape, orientation, number, alignment, distance and/or position of the subareas so that an event is triggered when the information carrier is brought into contact with the surface sensor. In this case, it is possible to control the program sequence of a device with the surface sensor. The subareas, i.e. the touch structure, comprises preferably corner points and/or filled surfaces defined by curves, for example rectangles, circles or similar figures.

The subareas can be, for example, 8 mm circles. This means that, virtually, they have a size of about 50×50 pixels on a surface sensor 50 mm wide and 75 mm high at 163 ppi (pixels per inch) resolution. 54 subareas of a size of 8 mm can be distributed on the surface sensor in a 6×9 arrangement. This yields the following:

The position of the subareas is determinable up to half of their diameter. The number of possible positions thus doubles per axis, although one position is lost in each case at the edge. This means that (6*2−1)×(9*2−1), i.e. 11×17 positions are distinguishable.

In an extreme case, one occupied position blocks nine possible neighbouring positions. If five positions are occupied, 5×9=45 positions of the 17×11=187 possible positions are lost. This means that 142 vacant positions remain. The vacant positions as subareas are subject to the binomial coefficient.

Therefore the formula $$\binom{142}{5}$$

yields the possible arrangements of the subareas. In this case, 448072338 different arrangements of subareas are possible. This figure can be expressed as a binary number with 29 positions. This yields at least $2^{28}$ possible arrangements and 28 bits of data can be represented. For the number of subareas from 5 to 18, the following table is yielded:

| | |
|---|---|
| 5 * 9 = 45 | 142 over 5 < $2^{29}$ |
| 6 * 9 = 54 | 133 over 6 < $2^{33}$ |
| 7 * 9 = 63 | 124 over 7 < $2^{37}$ |
| 8 * 9 = 72 | 115 over 8 < $2^{40}$ |
| 9 * 9 = 81 | 106 over 9 < $2^{42}$ |
| 10 * 9 = 90 | 97 over 10 < $2^{44}$ |
| 11 * 9 = 99 | 88 over 11 < $2^{45}$ |
| 12 * 9 = 108 | 79 over 12 < $2^{46}$ |
| 13 * 9 = 117 | 70 over 13 < $2^{46}$ |
| 14 * 9 = 126 | 61 over 14 < $2^{45}$ |
| 15 * 9 = 135 | 52 over 15 < $2^{43}$ |
| 16 * 9 = 144 | 43 over 16 < $2^{38}$ |
| 17 * 9 = 153 | 34 over 17 < $2^{32}$ |
| 18 * 9 = 162 | 25 over 18 < $2^{19}$ |

According to this, with twelve subareas there is a maximum of 45 bits of data which are representable according to this example. From this it follows:
  with a maximum of five subareas, up to a maximum of 28 bits are to be accommodated on an information carrier and
  with twelve subareas, up to a maximum of 45 bits are to be accommodated on an information carrier.

The quantity of data can be enlarged considerably by making the subareas smaller. For subareas with a size of 4 mm, the following is the case:
  with five distinguishable positions, up to 40 bits of data are theoretically possible,
  with twelve distinguishable positions, up to 84 bits of data are theoretically possible and
  with twenty distinguishable positions, theoretically up to 124 bits of data are theoretically possible.

Without intending to be limiting, the invention will now be described with reference to the Figures, wherein:

FIG. 1 to FIG. 4 Top views of preferred embodiments of an information carrier

Figure 5A:
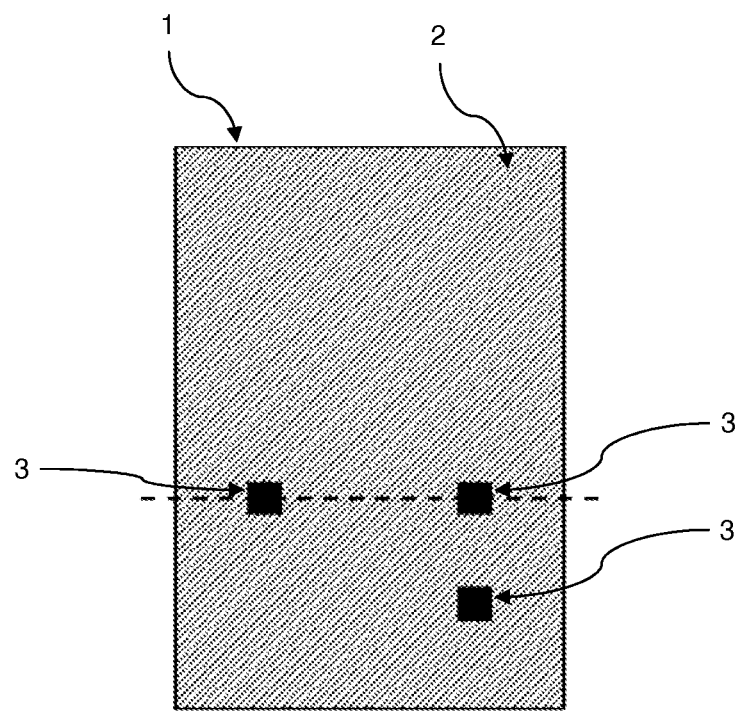
Figure 5B:
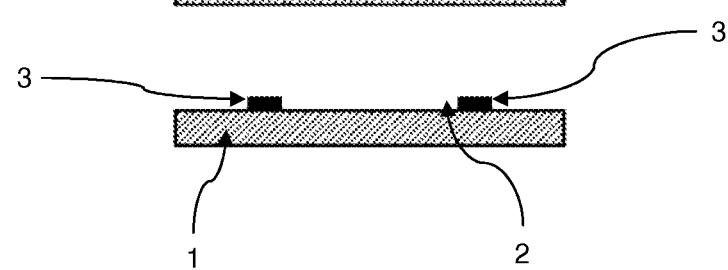

FIG. 5a and FIG. 5b Cross-sectional view of an information carrier

Figure 6:
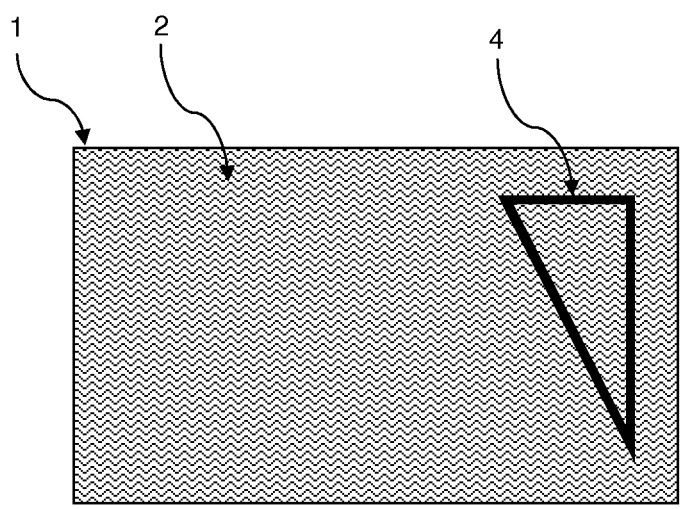
Figure 7:
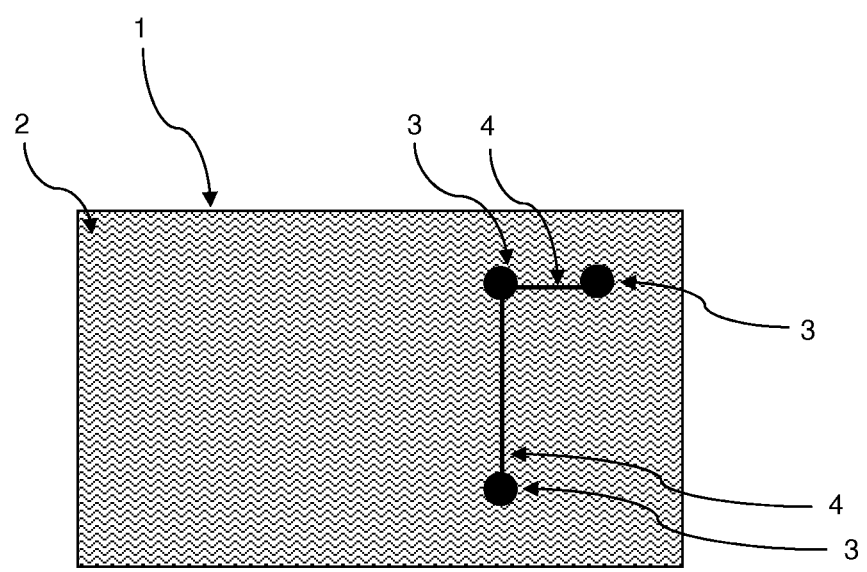
Figure 8:
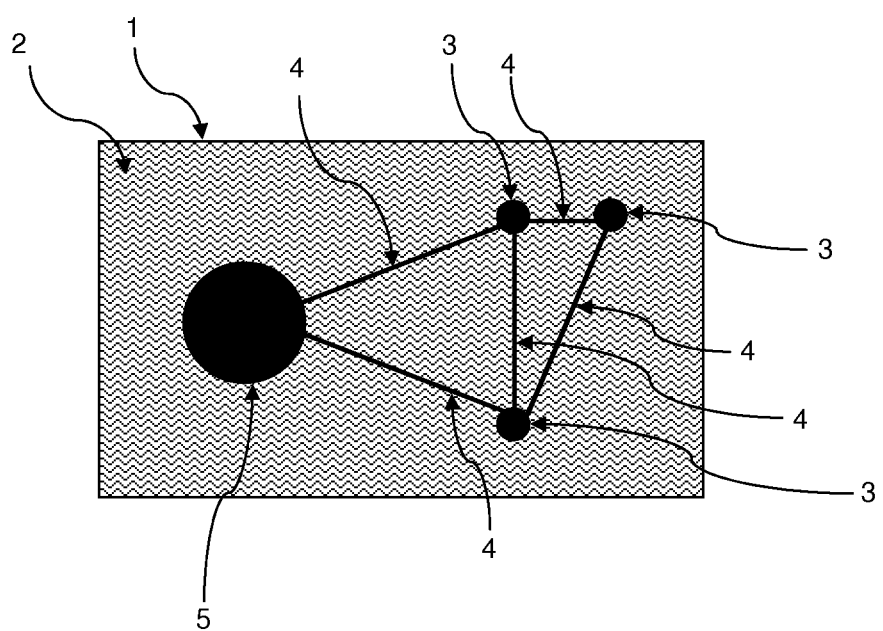
Figure 9:
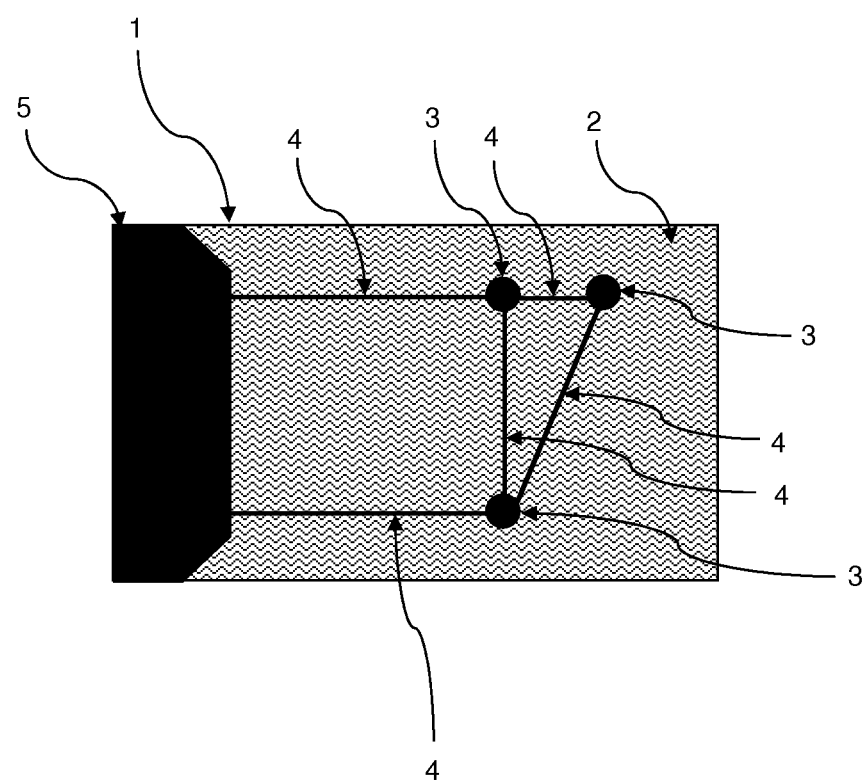
Figure 10:
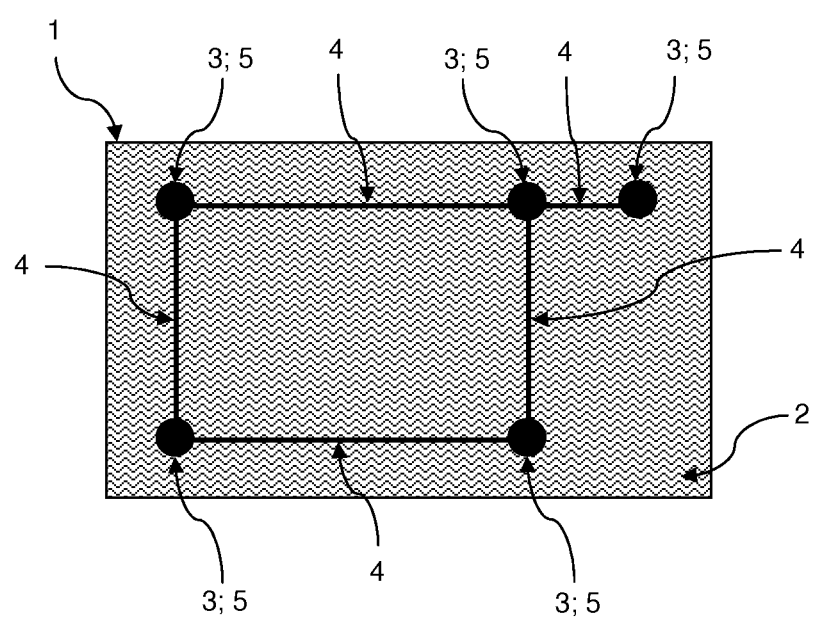
Figure 11:
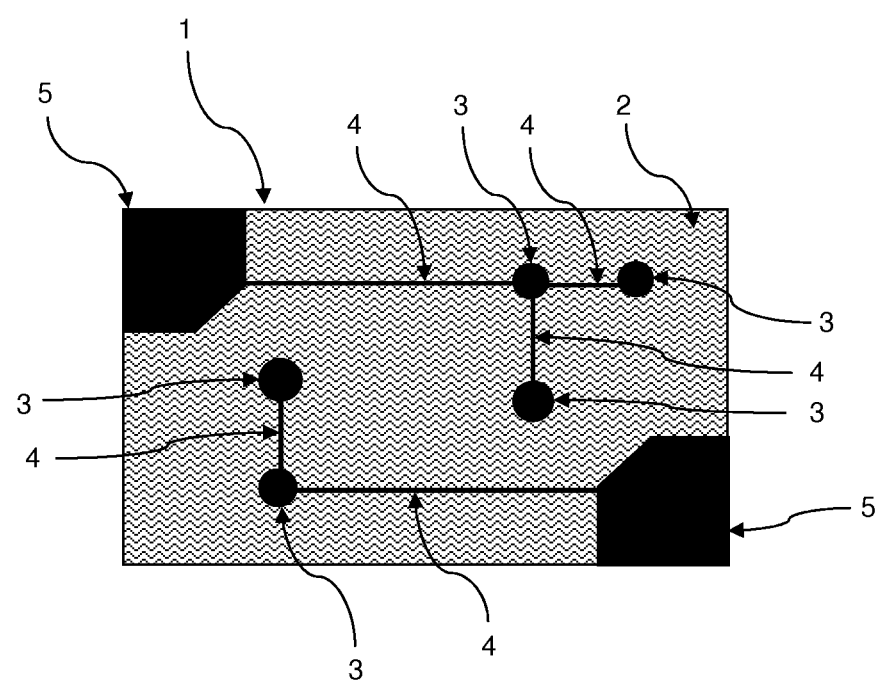

FIG. 6 and FIG. 7 Information carriers with conductive traces

FIG. 8 to FIG. 11 Information carrier with conductive traces and coupling surface(s)

Figure 12A:
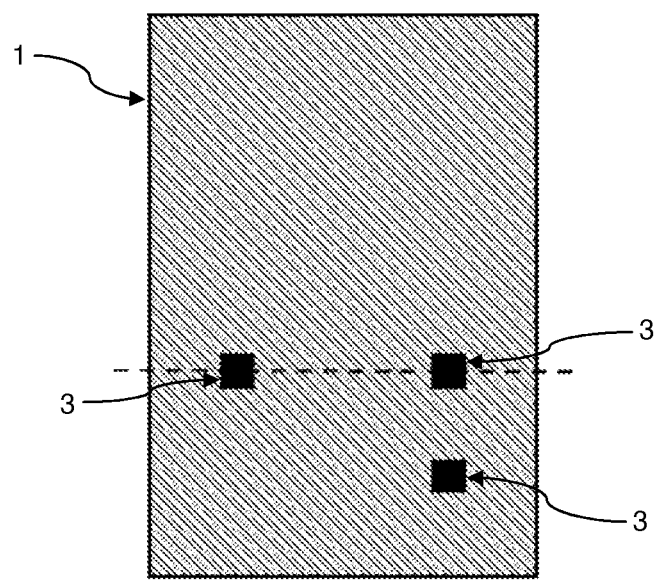
Figure 12B:
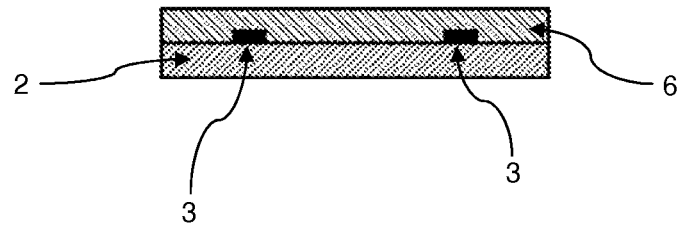
Figure 13:
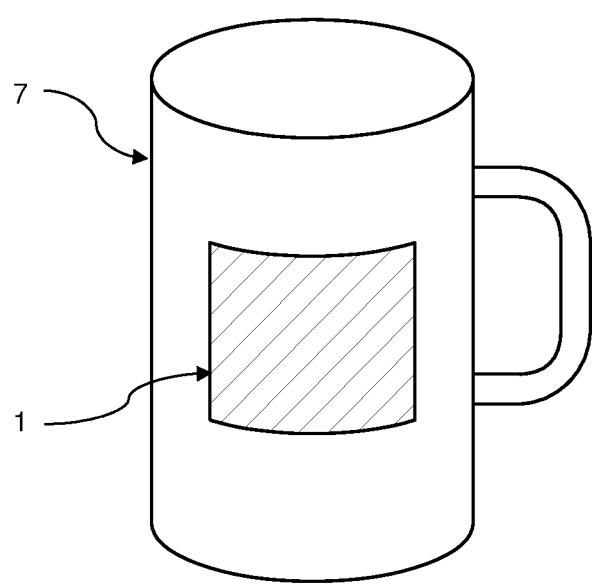
Figure 14:
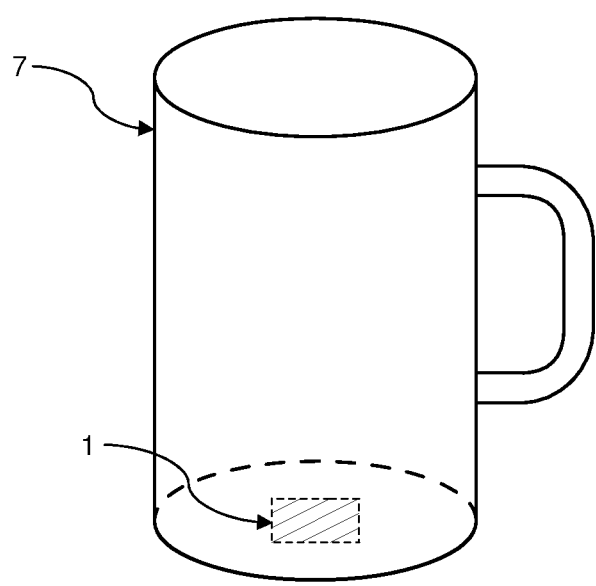
Figure 15:
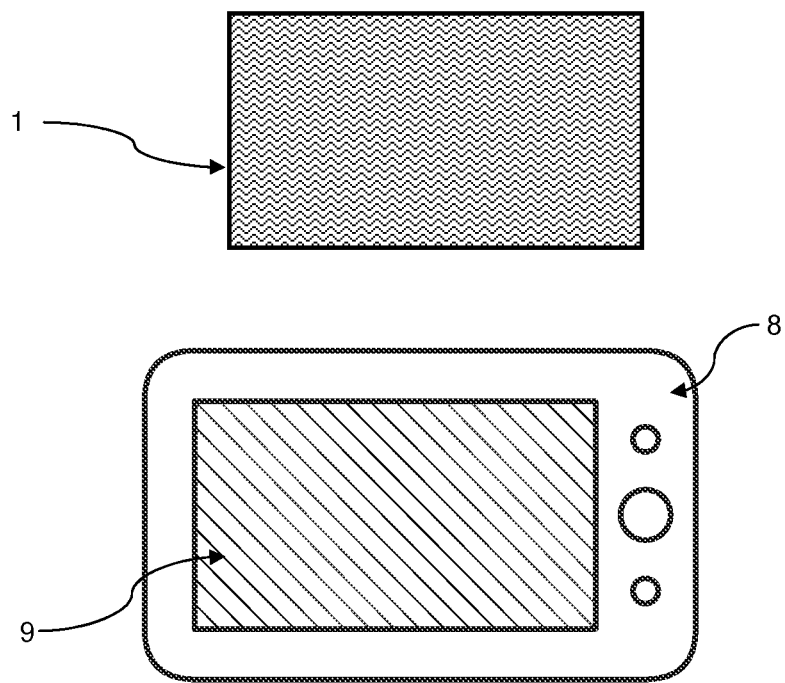
Figure 16:
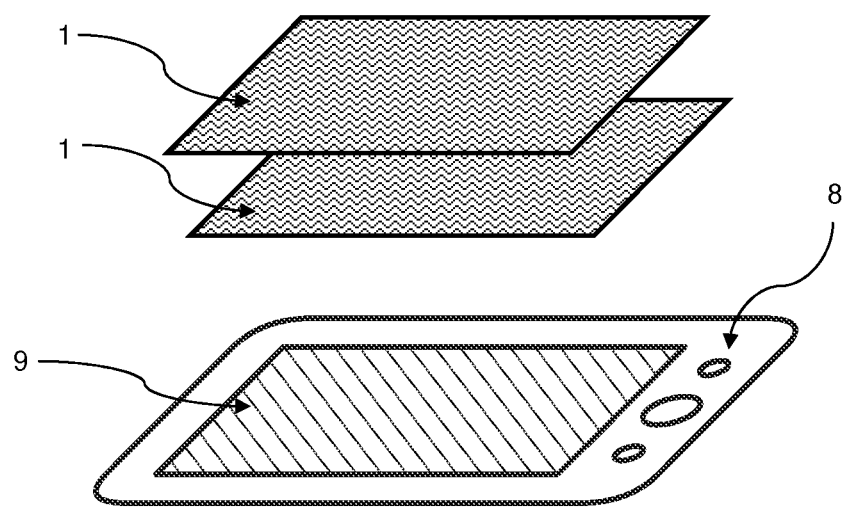
Figure 17:
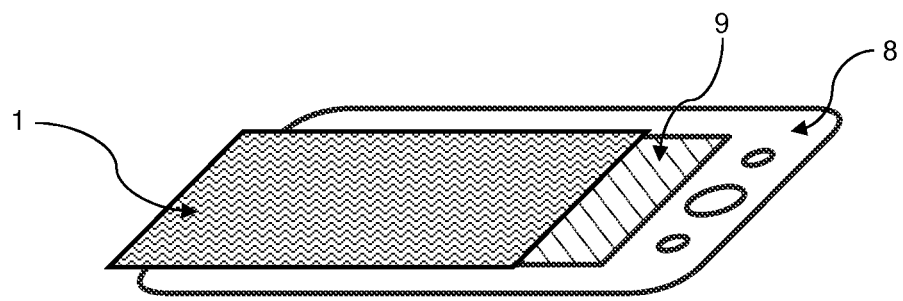
Figure 18:
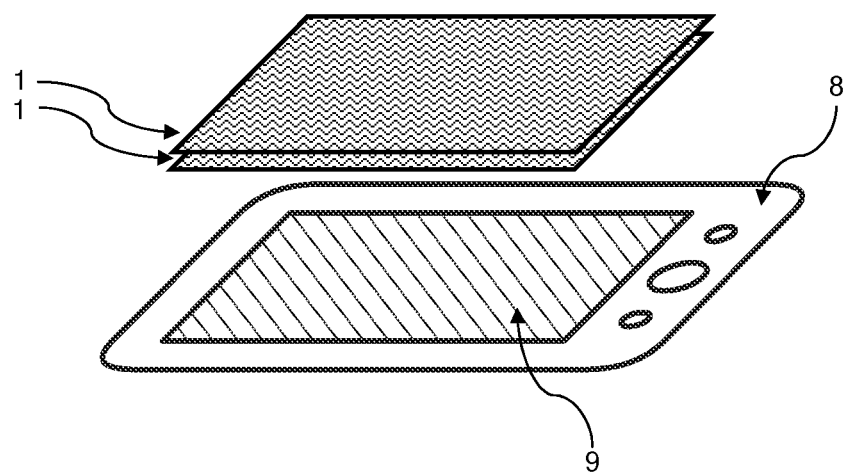
Figure 19:
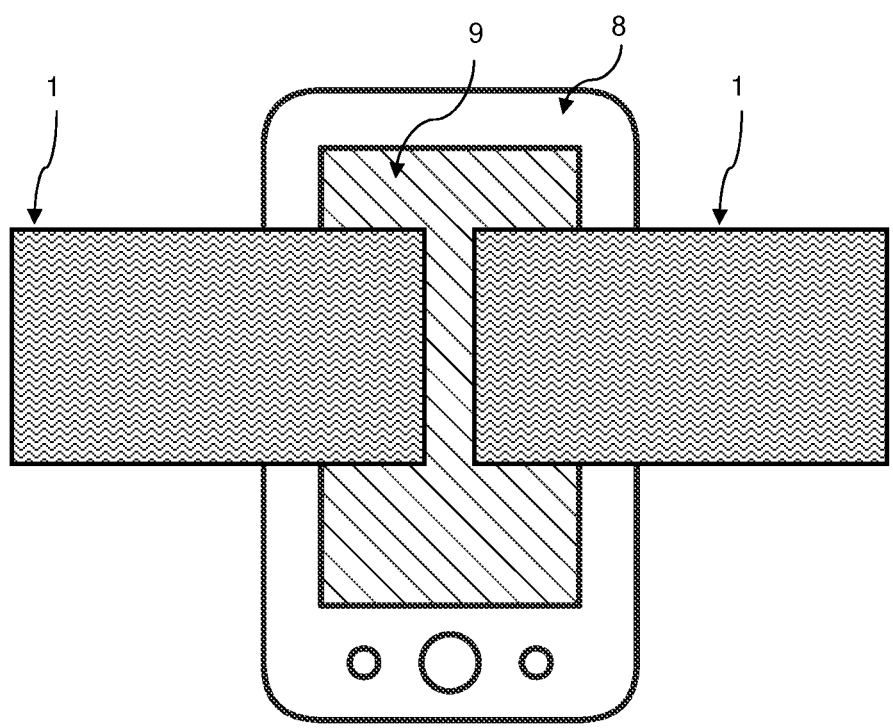

FIG. 12a and FIG. 12b Cross-sectional view of an information carrier with a cover layer FIG. 13 and FIG. 14 Information carrier on an object FIG. 15 to FIG. 20 Interaction of one or more information carriers with a surface sensor FIG. 21 to FIG. 25 Examples of applications of an information carrier FIG. 1 to FIG. 4 show top views of preferred embodiments of an information carrier 1. An information carrier 1 comprises preferably a substrate 2 with at least one layer which is applied area-wise and electrically conductive, with the layer being the touch structure. The touch structure comprises at least one conductive trace 4, a coupling surface 5 and/or a touch point 3. In FIG. 1, a touch point 3 is depicted as an example. The substrate 2 is a carrier and comprises preferably a plastic, a paper, a cardboard, a wood-based material, a composite, glass, ceramic, textiles, leather or a combination thereof. The electrically conductive touch points 3 are applied area-wise to the substrate 2.

Figure 4:
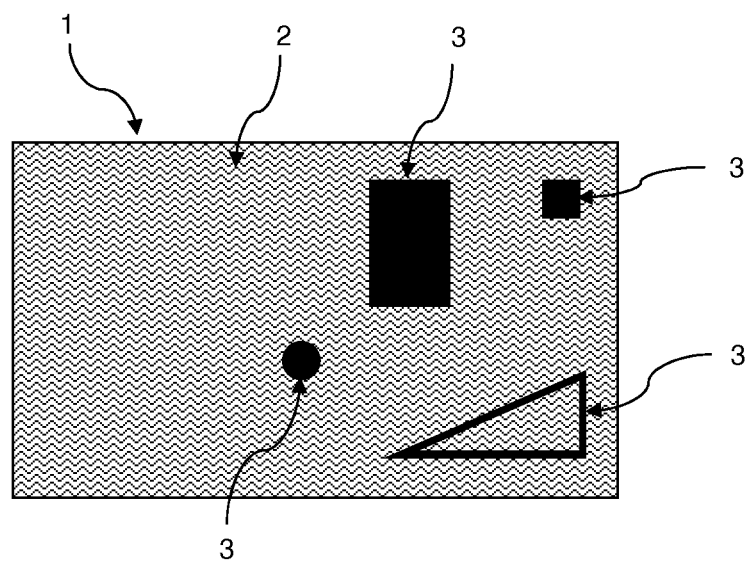

The touch points 3 can, for example, be applied in the form of circles and/or rectangles to the substrate 2. A touch point 3 can also advantageously be represented with different geometric figures (FIG. 1, 2, 3), these also being combinable with each other (FIG. 4).

FIG. 5a and FIG. 5b show an information carrier 1 in a cross-sectional view of the principle. The touch points 3 in FIG. 5b are raised for the purposes of illustration. Depending on the production process for the touch structure, the conductive trace 4, coupling surface 5 or touch point 3 can be raised (e.g. screen printing), flush with the surface (e.g. offset printing) or even lowered (e.g. hot embossing) in relation to the surrounding substrate 2.

FIG. 6 and FIG. 7 show the information carrier 1 with conductive traces 4. The subareas of the touch points 3 can be advantageously smaller, equal to (FIG. 6) or larger (FIG. 7) than the conductive traces 4. In further embodiments (FIG. 8, 9, 10, 11), at least one further subarea of the electrically conductive layer (the touch structure) as a coupling surface 5 is situated on the substrate 2. The individual subareas of the touch points 3 are preferably electrically conductively connected to each other via conductive traces 4. The touch points 3 and conductive traces 4 are advantageously formed out of the electrically conductive layer. It can however also be advantageous that the electrically conductive layers are made of a different material. This can then be preferred in particular if the electrically conductive layers are to have a different electrical conductivity.

FIG. 12a and FIG. 12b show an information carrier 1 with a cover layer 6 in a cross-sectional view of the principle. On the substrate 2 and the electrically conductive touch structure are situated at least one cover layer 6 so that there is a compact information carrier 1 and the touch structure (e.g. the touch points 3) are not damaged or are not visible from outside. The cover layer 6 can also be designed as a cover plate.

FIG. 13 and FIG. 14 show an information carrier 1 on an object 7. The inventive information carrier 1 can be advantageously attachable to an object 7, for example a cup. As a result, a purchaser of an object can advantageously obtain digital information quickly and simply via the information carrier 1. The information carrier 1 is preferably printed on the object 7, wherein the information carrier 1 can be applied to a level or non-level surface.

Figure 20A:
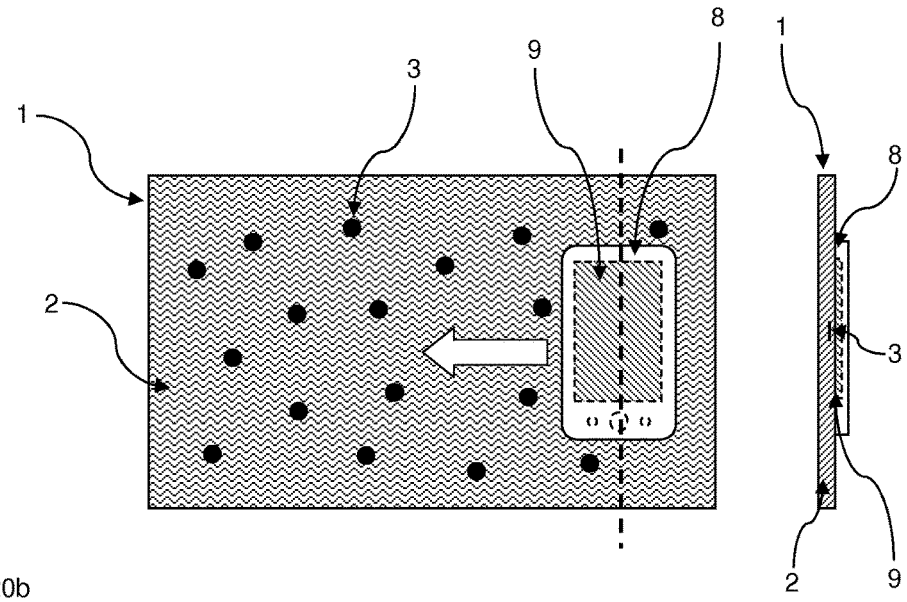
Figure 20B:
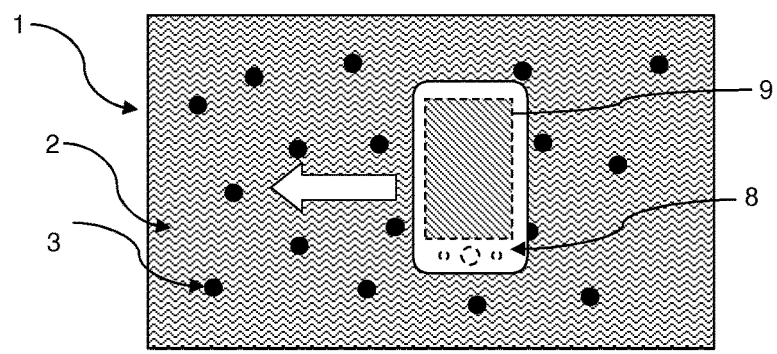
Figure 20C:
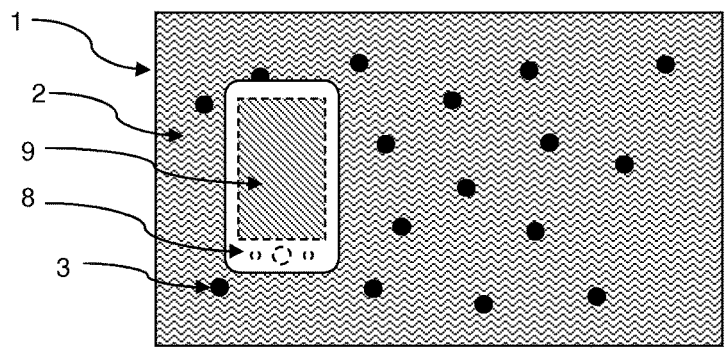
Figure 21:
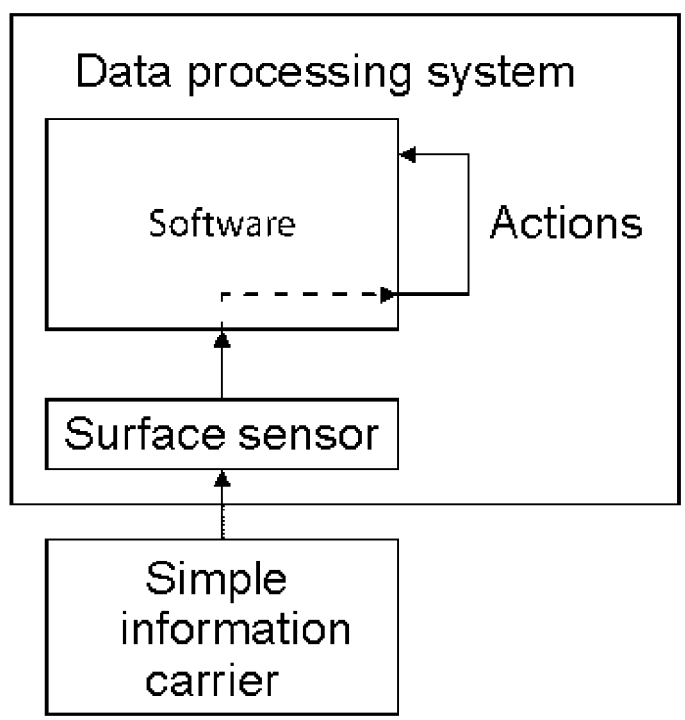
Figure 22:
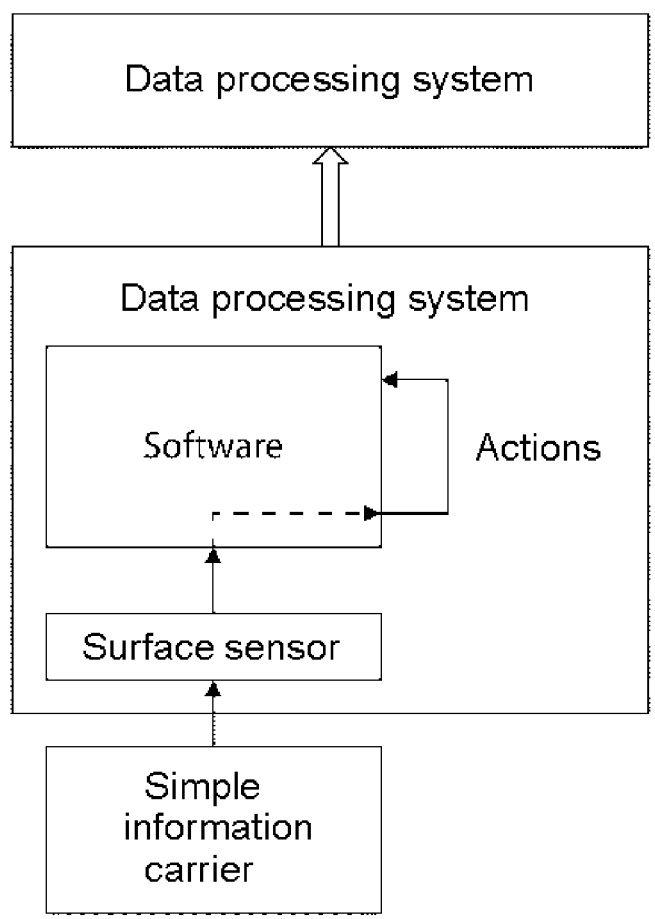
Figure 23:
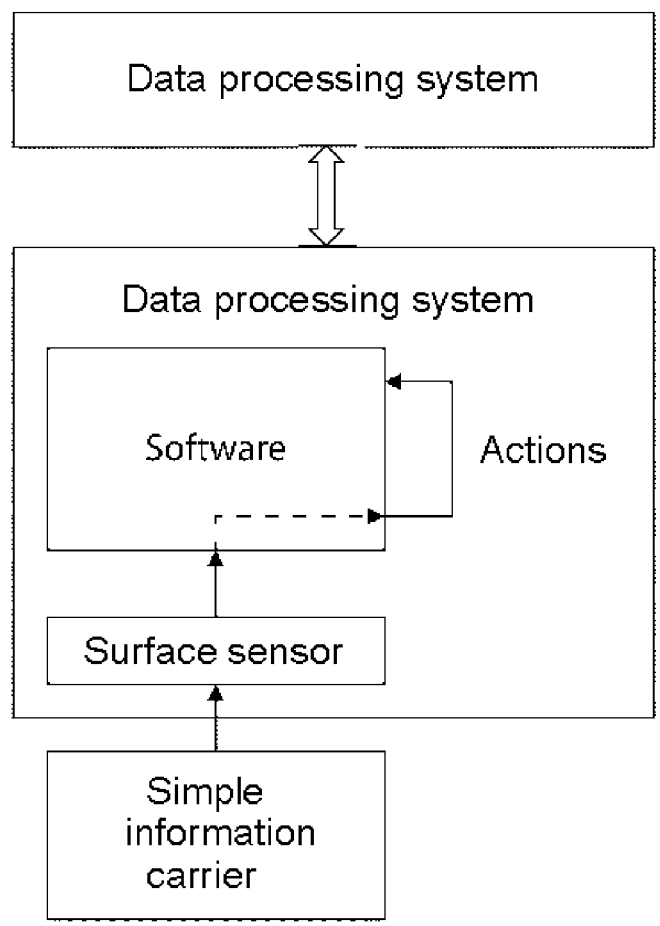
Figure 24:
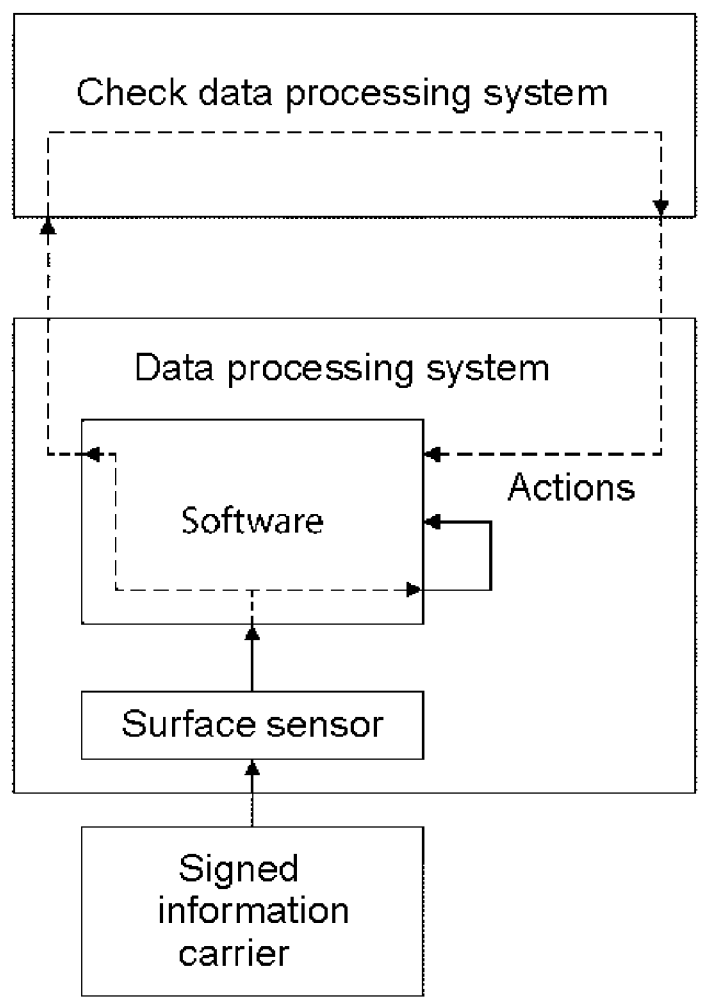
Figure 25:
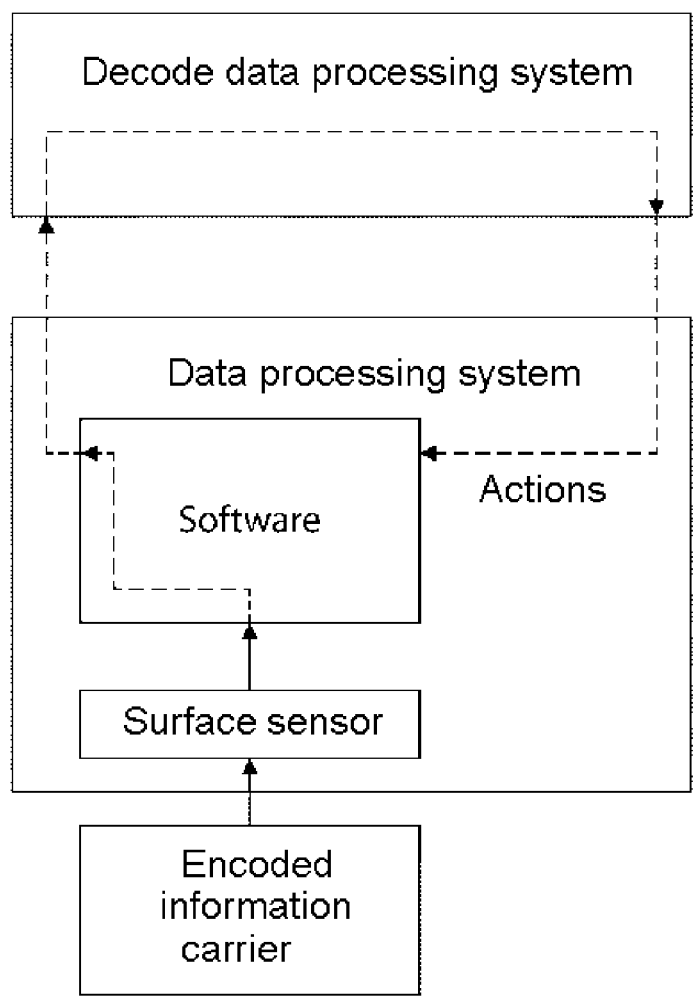

FIG. 15 to FIG. 20 show a preferred system comprising one or more information carriers 1 and a surface sensor 9. The information carrier 1 with the information stored on it can be brought into contact with the device with the surface sensor 8. The device with the surface sensor 8 is preferably a data-processing device. The information carrier 1 can, for example, come only area-wise into contact with the surface sensor 9. It can also be preferred that the information carrier 1 is not laid on the surface sensor 9, but moved over it. Due to a different type of contact or proximity, a different event can be preferably triggered on the surface sensor 9. Furthermore, several information carriers 1 can interact with the surface sensor 9. In FIG. 20, the surface sensor 9, i.e. the device with the surface sensor 8, is moved over an information carrier 1, wherein the information carrier 1 has to come into contact or proximity with the surface sensor 9 several times in different positions so that the complete information of the information carrier 1 becomes readable. As a result, larger quantities of information can be stored in the information carrier 1 because the information carrier 1 can be larger than the surface sensor 9. The reading of the information by the device with the surface sensor 8 can be preferably realized with swipe motions.

FIG. 21 to FIG. 25 show by way of example preferred applications of an information carrier. The information carrier can be used for example as a simple information carrier (FIG. 21) that interacts with the surface sensor, as a result of which an event is preferably triggered. The event in turn triggers actions, such as the activation and/or termination of an application, the changing of numeric values and/or texts, the manipulation of graphics, the changing of data pools or the obtaining of access to information services, without being limited to these. In addition, according to FIG. 22, it is possible to influence the program sequence of a data-processing system of the device itself by means of the surface sensor, for example in the form of a capacitive touchscreen of a device. The triggered action can be one-way or two-way, i.e. an action can be triggered that acts upon an external data-processing system, wherein this in turn acts upon that of the data-processing device (see FIG. 23). Furthermore, the information carrier can be designed as a signed information carrier (see FIG. 24), wherein an interaction between the data-processing device, a data network and a data-processing system preferably arises. In this way, the signed information carrier can be, for example, checked and verified via the Internet. With the aid of the inventive system, access to and/or use of a data-processing system are made possible. To this end, the device is connected to a data-processing system by means of the information carrier via a data network. After the checking of the signature in the data-processing system, access is afforded via the device. Furthermore, according to FIG. 25, the information carrier can also be coded, wherein it interacts in particular with a device, a data network and a data-processing system. Via the surface sensor of the device, a use of a data-processing system is made possible. To this end, the device is connected via a data network to the data-processing system. After a positive check of the information carrier in the data-processing system, access is afforded via the device.

KEY TO DRAWING

1 Information carrier
2 Substrate

3 Touch point
4 Conductive trace
5 Coupling surface
6 Cover layer
7 Object
8 Device with surface sensor
9 Surface sensor

The invention claimed is:

1. A system for transmitting information, comprising at least
    a) a capacitive information carrier, said information carrier having at least one electrically conductive layer including a planar surface and present on an electrically non-conductive substrate, wherein the electrically conductive layer is configured as a touch structure and comprises at least one touch point, a coupling surface and/or a conductive trace; and
    b) a capacitive surface sensor having a planar surface;
    wherein the capacitive information carrier and the capacitive surface sensor are separate components and the planar surface of the electrically conductive layer of the capacitive information carrier and the planar surface of the capacitive surface sensor are configured to be brought in and out of contact with each other and a capacitive interaction exists between the capacitive information carrier and the capacitive surface sensor when the planar surface of the electrically conductive layer of the capacitive information carrier is brought in contact with the planar surface of the capacitive surface sensor.

2. The system according to claim 1,
wherein
at least one electrically conductive touch structure replicating an arrangement and/or properties of fingertips is arranged on an electrically non-conductive substrate.

3. The system according to claim 1,
wherein
the capacitive information carrier has at least one cover layer wholly or partly covering the substrate.

4. The system according to claim 1,
wherein
the capacitive information carrier is connected to an object or the object itself serves as the substrate.

5. The system according to claim 1,
wherein
as a result of an capacitive interaction, the touch structure of the capacitive information carrier become evaluable for a data-processing system connected to the capacitive surface sensor, which system can trigger events associated with the capacitive information carrier.

6. The system according to claim 1,
wherein
the capacitive surface sensor comprises a capacitive touchscreens and/or touchpad and is selected from the group consisting of smartphones, mobile phones, displays, tablet PCs, tablet notebooks, touchpad devices, graphics tablets, televisions, PDAs, MP3 players, trackpads and capacitive input devices.

7. The system according to claim 1,
wherein
at least one capacitive information carrier is brought in contact with at least one capacitive surface sensor at least sectionally.

8. The system according to claim 1,
wherein
the capacitive surface sensor, in a movement relative to the capacitive information carrier, progressively receives information wholly or partly from the capacitive information carrier.

9. The system according to claim 1,
wherein
several capacitive information carriers in combination are in contact with the capacitive surface sensor.

10. The system according to claim 9, wherein said capacitive information carriers are next to one another and/or one on top of one another temporarily.

11. The system according to claim 1, wherein the capacitive information carrier includes a plurality of electrically conductive touch points.

12. The system according to claim 11, wherein the capacitive information carrier includes a top surface comprising the electrically conductive touch points surrounded by areas of the electrically non-conductive substrate.

13. The system according to claim 1, wherein the capacitive surface sensor comprises a capacitive touchscreen.

14. A process for acquiring information, comprising
    a) providing at least one capacitive information carrier comprising at least one electrically conductive layer including a planar surface and present on an electrically non-conductive substrate, wherein the electrically conductive layer is configured as a touch structure and comprises at least one touch point, a coupling surface and/or a conductive trace,
    b) providing at least one capacitive surface sensor including a planar surface, wherein the capacitive information carrier and the capacitive surface sensor are separate components and the planar surface of the electrically conductive layer of the capacitive information carrier and the planar surface of the capacitive surface sensor are configured to be brought in and out of contact with each other,
    c) contacting the planar surface of the capacitive information carrier according to a) with the planar surface of the capacitive surface sensor according to b), wherein the contact can be static and/or dynamic and
    d) triggering a capacitive interaction between the capacitive surface sensor and the capacitive information carrier, wherein, as a result of the capacitive interaction, the touch structure of the information carrier becomes evaluable for a data-processing system connected to the capacitive surface sensor and can trigger events associated with the capacitive information carrier.

15. The process according to claim 14,
wherein
the capacitive information carrier is assigned to a data set in a data-processing system and the data set remains constant and/or changes.

16. The process according to claim 14,
wherein
the capacitive information carrier in connection with the capacitive surface sensor is assigned via the touch structure to an action of a data-processing system or triggers said action.

* * * * *